United States Patent [19]

Krakkay et al.

[11] Patent Number: 4,683,286
[45] Date of Patent: Jul. 28, 1987

[54] POLYACRYLONITRILES WITH A LOW K VALUE, A PROCESS FOR THEIR PREPARATION AND THEIR SUITABLE USE

[75] Inventors: Tibor Krakkay, Munich; Tatjana Poggi, Saal; Ernst Schubert, Kelheim/Donau, all of Fed. Rep. of Germany

[73] Assignee: Hoechst Aktiengesellschaft, Frankfurt am Main, Fed. Rep. of Germany

[21] Appl. No.: 832,453

[22] Filed: Feb. 21, 1986

Related U.S. Application Data

[63] Continuation-in-part of Ser. No. 636,965, Aug. 2, 1984, abandoned.

[30] Foreign Application Priority Data

Aug. 5, 1983 [DE] Fed. Rep. of Germany ....... 3328276

[51] Int. Cl.$^4$ ................................................. C08F 8/12
[52] U.S. Cl. ............................... 525/329.1; 525/329.2; 525/329.3; 525/344; 525/368; 525/369; 526/329.3
[58] Field of Search ............... 525/329.1, 329.2, 329.3; 526/329.3

[56] References Cited

U.S. PATENT DOCUMENTS

| | | | |
|---|---|---|---|
| 2,749,330 | 6/1956 | Banes et al. ...................... | 525/329.2 |
| 2,812,317 | 5/1957 | Barrett ............................. | 525/329.2 |
| 2,861,059 | 11/1958 | Mowry et al. .................... | 525/329.2 |
| 2,916,477 | 12/1959 | Ott .................................... | 525/329.2 |
| 2,934,524 | 4/1960 | Phelps et al. ..................... | 526/329.3 |
| 3,021,301 | 2/1962 | Suen et al. ........................ | 525/329.1 |
| 3,025,278 | 3/1962 | Pitts .................................. | 526/329.3 |
| 3,200,100 | 8/1965 | Dennstedt ......................... | 526/329.3 |
| 3,255,158 | 6/1966 | Authes .............................. | 526/329.3 |
| 3,758,449 | 9/1973 | Hoppe et al. ..................... | 525/329.1 |
| 3,897,382 | 7/1975 | Stoy et al. ........................ | 525/329.1 |
| 4,326,051 | 4/1982 | Suling et al. ..................... | 526/329.3 |

*Primary Examiner*—Joseph L. Schofer
*Assistant Examiner*—Bernard Lipman
*Attorney, Agent, or Firm*—Connolly & Hutz

[57] ABSTRACT

The invention relates to homopolymers and copolymers of acrylonitrile with very low Fikentscher K values of 34-15 and a total content of sulfonate and sulfate end groups, which do not originate from correspondingly substituted comonomers, of 250 to 1,000 milliequivalents per kilogram of polymer, 180 to 900 milliequivalents per kilogram being in the form of sulfonate end groups, and to suitable semi-continuous or continuous precipitation polymerization processes for their preparation by means of a redox system in an aqueous medium.

The resulting polymers can be extruded to shaped articles. In particular, after hydrolysis, they can be used as emulsifiers and deep bore auxiliaries.

2 Claims, No Drawings

POLYACRYLONITRILES WITH A LOW K VALUE, A PROCESS FOR THEIR PREPARATION AND THEIR SUITABLE USE

The invention relates to hydrolyzed products of homopolymers and copolymers of acrylonitrile with extremely low K values of 34 to 15, and to methods for their using.

High molecular weight homopolymers and copolymers of acrylonitrile are produced on a large scale in industry. They are used, in particular, as a raw material for the production of fibers and threads. The K value of these high molecular weight polymers is as a rule 80 to 90. The polymers are predominantly prepared by the process of precipitation polymerization in an aqueous medium. The redox polymerization process, in which a free radical donor—an inorganic per-compound—is used together with a reducing agent, is usually preferred. For the concept and the determination of the K value, c.f. Fikentscher, Cellulosechemie 13 (1932), 58.

Low molecular weight homopolymers and copolymers of acrylonitrile have already frequently been described. However, it is difficult to compare the results thereby obtained, since the molecular weights $M_v$ determined by viscometry are calculated from the intrinsic viscosity $[\eta]$ determined by viscometry using the most diverse equations. Some authors have resorted to osmometric determinations instead of the values determined by viscometry, and give molecular weights $M_n$ as the number-average. As is knwon, the values for the molecular weights $M_v$ and $M_n$ agree only in the rarest of cases, it being possible, for example, for the value of $M_n$ to be only half the value of $M_v$. The Fikentscher "K value" is used in the present text as the parameter for characterizing the average size of the molecule. It is an acrylonitrile polymer parameter which is generally customary in the art.

The preparation of acrylonitrile homopolymers with low molecular weights $M_v$ of 21,690 to 8,650 has already been described in Colloid and Polymer Science 256, 1027 (1978). The polymerization is carried out by the solution polymerization process in dimethylformamide, using an organic azo compound as a free radical donor. In this process, the end product is obtained in solution and must still be isolated in an expensive manner. Such polymers contain no sulfonate and/or sulfate end groups.

Another solution polymerization process for the preparation of low molecular weight polyacrylonitriles, with molecular weights $M_v$ of about 30,000 to 2,000, is also described, in U.S. Pat. No. 2,763,636. The polymerization is carried out in concentrated salt solutions, for examle zinc chloride solutions, with $H_2O_2$ or $K_2S_2O_8$ as a catalyst. Howver, it is carried out without a reducing agent in the presence of $Cu^{2+}$ ions.

The homopolymers and copolymers of acrylonitrile described in U.S. Pat. No. 3,208,962 are also prepared by solution polymerization processes in concentrated zinc chloride solutions by means of $H_2O_2$ and oxyacids of chlorine. As in the processes described above, the end product can be isolated only in an expensive manner, and the recovery of the salt solutions used is associated with considerable difficulties.

German Auslegeschrift No. 2,655,714 described processes for the preparation of homopolymers of acrylonitrile which have very low K values and are also prepared by a precipitation polymerization process. However, a mixture of isopropanol and water is used as the reaction medium and the polymerization is carried out batchwise. The presence of isopropanol in the reaction mixture makes it difficult to recover the unreacted monomeric acrylonitrile, since a three-component system must now be separated by distillation, instead of acrylonitrile and water. In this previous literature, $H_2O_2$ is described as the catalyst and hydroxylamine salts or hydrazine salts are described as the activator. Because of their toxicity, these reducing agents lead to environmental problems in the effluents. In addition, the above polymers contain no sulfonate and/or sulfate end groups in the chain molecule.

German Pat. No. 2,318,609 describes the preparation of homopolymers and copolymers of acrylonitrile by the precipitation polymerization process. Water is used as the reaction medium and the reaction is carried out with a persulfate catalyst and a pyrosulfite activator. However, the process leads only to polymers down to a K value of 35. It is also a disadvantage that the reaction is carried out only in dilute aqueous solutions at low acrylonitrile concentrations of 0.1 to 1.5% by weight, based on the reaction mixture, which unavoidably leads to low space/time yields. The polymerization is carried out in the absence of iron ions, and polyphosphates, which serve as complexing agents for iron and traces of heavy metal, are added to the reaction mixture. Low molecular weight acrylonitrile homopolymers which have been prepared by batchwise precipitation polymerization in an aqueous medium at pH values >4 by means of persulfate catalysts without using activators or accelerators are also described in U.S. Pat. No. 3,488,336. The very low molecular weights are only achieved by carrying out the polymerization of the acrylonitrile in very high dilution at monomer concentrations of 0.05 to 0.5% by weight over very long reaction times. The yields are at most 23%, from which a space/time yield of only 0.01 to 0.2 g of polymer per liter of reaction solution and hour is calculated. The method described is thus unsuitable for an industrial process. Moreover, the resulting polymers contain virtually no sulfonate end groups.

It is emphasized both in German Pat. No. 2,318,609 and in U.S. Pat. No. 3,488,336 that low molecular weight polyacrylonitriles can only be obtained if the polymerization of acrylonitrile is carried out in very dilute aqueous solution.

There was therefore still the object of preparing acrylonitrile homopolymers and copolymers which have very low K values and a high content of strongly acid end groups, and to develop a process for this which can be carried out on a large industrial scale, as far as possible utilizes the precipitation polymerization process carried out on a wide scale in industry for the preparation of polyacrylonitriles as a raw material for fibers, does not require new chemicals of chemicals other than those necessary for the preparation of the known polyacrylonitrile raw materials. Said polymers should be transformed into hydrolyzed products by an aqueous alkaline hydrolysis, and the hydrolyzed products should exhibit remarkable surface-active properties due to their low K-value and the high content of terminal sulfonic acid groups.

Surprisingly, it has now been found that, in contrast to the teachings of the prior art, it is after all possible to prepare acrylonitrile homopolymers and copolymers with the desired very low K value of 34 to 15 and a very high content of sulfonate and sulfate end groups, and in particular using a very high monomer concentration, by the process of precipitation polymerization in aqueous solution by means of a redox system. The process found can be operated with high space/time yields.

The invention thus relates to, inter alia, a continuous or semi-continuous process for the preparation of acrylonitrile homopolymers or copolymers which contain at least 60% by weight of acrylonitrile units and up to 40% by weight of units which can be copolymerized with acrylonitrile, and have Fikentscher K values of 34 to 15. These K values correspond to average molecular weights $M_v$(on the basis of measurements by viscometry) of about 10,000 to 2,700. These values have been calculated in accordance with the method of Marzolph and Scholtan, Makromoleulare Chemie 57, 52 (1962). These polymers are obtained by continuous or semi-continuous polymerization by the process of precipitation polymerization using high monomer concentrations of 12 to 30% by weight, preferably 12 to 27%, based on the total amounts of water and monomers metered in during the same unit of time, in an aqueous medium by means of a redox system, the redox system consisting of a persulfate catalyst in concentrations of 0.5 to 2.5% by weight (calculated as $S_2O_8^{-2}$), a sulfite activator in concentrations of 5 to 25% by weight (calculated as $S_2O_5^{2-}$) and iron ions as an accelerator in concentrations of $6\times10^{-4}$ to $2\times10^{-2}$% by weight, in each case based on the amount of water metered in in the same unit of time, the weight ratio of persulfate to pyrosulfite varying from 1:2 to 1:30 and the average residence time of the monomers in the reaction mixture during the polymerization being 1 to 4 hours, preferably 1.5 to 2.5 hours. Preferably, potassium persulfate is used as the catalyst, sodium pyrosulfite is used as the activator and Mohr's salt is used as the source of iron ions. The polymerization temperature is usually 30° to 65° C., and is preferably between 45° and 60° C. Any compound which can be copolymerized with acrylonitrile can be used as the comonomer. Preferred comonomers are methyl acrylate and vinyl acetate. The space/time yield in the polymerization by the process according to the invention is 25 to 105, preferably 50 to 95, g/liter.-hour and in thus many times greater than the space/time yield of processes according to the prior art.

The acrylonitrile homopolymers and copolymers according to the invention with the desired low K values of 34 to 15 are only obtained if the following 5 parameters are kept within the required limits:
concentration of persulfate catalyst
concentration of sulfite activator
concentration of iron ions as the accelerator
ratio of persulfate to pyrosulfite and
residence time of the monomers in the reaction mixture.
If the values given for the ranges are exceeded , a greater expenditure achieves no further technical effect. If the values fall below the lower limits of the ranges of these 5 parameters, polymers with the desired K values of below 34 are no longer obtained.

It is evident that the parameters cannot be chosen arbitrarily within the abovementioned limits. They depend on one another and must therefore be matched to one another, in order to obtain the desired polymers with K values $\leq 34$. The following guidelines are for this purpose, in addition to the statements in the examples.

If smaller amounts of catalyst are used, the concentration of accelerator should be increased and the polymerization should be carried out at a high activator concentration (increased catalyst/activator ratio).

If a low catalyst/activator ratio is used, high concentrations of catalyst and accelerator must be employed. A small amount of iron ions requires longer residence times and large amounts of catalyst and activator as well as a high catalyst/activator ratio.

For a shorter residence time, the polymerization must be carried out with large amounts of catalyst, activator and accelerator as well as a high catalyst/activator ratio.

A reduction in the monomer concentration in general leads to polymers with a lower K value. If pure acrylonitrile is used instead of a mixture of acrylonitrile and comonomer(s), the K value of the polymer prepared therefrom likewise decreases.

Keeping within the range of monomer concentration of 12 to 30% by weight, based on the total amount of water and monomers metered in during the same unit of time, ensures rational industrial production. If the limit is exceeded, reasonable handling of the reaction mixture, which becomes ever more viscous, can no longer be guaranteed with certainty, and if the value falls below the limit of 12%, the space/time yield is reduced to such an extent that it no longer makes sense to carry out the polymerization industrially.

The polyacrylonitriles prepared according to the invention with K values of 34 to 15 are distinguished by a very high total content of sulfonate and sulfate end groups of 250 to 1,000 milliequivalents/kg of polymer, with contents of sulfonate end groups of 180 to 900 milliequivalents/kg of polymer. This range corresponds to a total content of —$SO_3Na$ and —$OSO_3Na$ of about 2.5 of more than 10% by weight. It should be pointed out here that these data in each case relate to contents of end groups. These values are thus achieved without the addition of comonmers which already contain corresponding groups in the molecule.

The suspensions obtained in the polymerizations carried out according to the invention can be separated by filtration or centrifugation and are thus obtained as water-containing cakes. It has been found that the particle size of the polymer decreases greatly as the K value decreases. However, no separation or washing problems occur if centrifuges are used instead of filter apparatuses. In contrast to polyacrylonitrile with a high K value, the products according to the invention are soluble not only in aprotic solvents, such as, for example, dimethylformamide, but also in mixtures of, for example, acetonitrile and water. 10% strength polymer solutions in dimenthylformamide gel only after addition of about 25% of water. This astonishing deviation from the known acrylonitrile polymers is caused by the high content of sulfonate and sulfate end groups.

When the polymers according to the invention are subjected to an alkaline aqueous hydrolysis, hydrolysis products are obtained, depending on the alkali/nitrile group ratio and on the saponification time, which products still contain in the molecule a significant quantity of nitrogen in a form which is difficult to hydrolyze, in addition to predominant polyacrylic acid units. During the hydrolysis, the (terminal) sulfuric acid ester groups —C—$OSO_3Na$ are saponified, $Na_2SO_4$ being formed. In contrast thereto, the terminal sulfonate groups are resistant to hydrolysis and remain in the molecule, so that sulfonate groups or hydroxyl groups are present at the chain ends of the hydrolyzed products.

As shown in the examples, it is not possible to obtain nitrogen-free products even in alkaline aqueous hydrolysis and with the use of excess NaOH. Analytical investigations on the hydrolyzed products obtained, which had been converted into the free acid form, showed that, in addition to the remaining, strongly acidic sulfonic acid groups, further groups have been formed which show a strong acid reaction and, in their strength, markedly differ from the carboxyl groups of the acrylic acid units formed in the hydrolyzed product.

To explain this phenomenon, the following reaction sequence is assumed. The alkaline hydrolysis of the polyacrylonitrile initially takes place certainly via the stage of polyacrylamide and then continues to a hydrolyzed product with a predominant number of acrylic acid units. Additionally, however, it is certainly possible, for example, for two adjacent acrylamide groups to react with elimination of one molecule of NH$_3$ and with cyclization to give a glutaramide unit

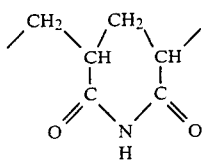

In such cyclic acid imides, the hydrogen atom bonded to the nitrogen can readily dissociate off as a proton which can easily be determined by alkalimetry. It is suspected that, in the hydrolyzed products according to the present invention, the formation of additional, strongly acidic groups is to be ascribed to the formation of such glutarimide units. These additional, strongly acidic groups certainly are not sulfonic acid groups or eliminated sulfuric acid. As will be described in detail in the analytical part, the acidic action of these additionally found groups can be suppressed in mixtures of 95% of acetone and 5% of water. When this solvent mixture is used, only the first stage of sulfuric acid and the sulfonic acid groups in the strongly acidic region are then determined.

The NMR analysis of the hydrolyzed products also does not show identity with polyacrylic acid patterns. A precise allocation of the observed deviations is at present not yet possible.

These hydrolysis products are suitable, for example, as emulsifiers, detergent raw materials and auxiliaries, in particular as scale inhibitors for deep bores and in crude oil production.

In particular, waters with a very high salt load, containing large amounts of calcium compounds and magnesium compounds, which are initially still dissolved, are frequently observed in the amounts of water obtained with crude oil. However, this high content of calcium compounds easily leads to obstruction or blockages in the conveyor pipelines.

The National Association of Corrosion Engineers (NACE) has standardized test methods which allow testing of compounds which are said to be capable of preventing deposition or precipitation of calcium carbonate or calcium sulfate from corresponding solutions or soles. The NACE standard TM 03-74 has been used as the test method in the examples which follow. In these tests, it was found that exceptionally small amounts of, for example, 0.5 to 1 ppm of an approximately 15% strength aqueous solution of a hydrolysis product of the polymers according to the invention are already sufficient completely to prevent deposition of calcium sulfate under the chosen conditions. It is more difficult to prevent deposition of calcium carbonate. According to the investigations carried out, about 5 ppm of the 15% strength hydrolysate solution are required to keep at least 60% of the calcium carbonate which otherwise precipitates in solution.

A further preferred field of application of the hydrolyzed products according to the invention is their use as detergent raw materials. For most applications, it is then sufficient to employ the hydrolyzed products in the form of the hydrolyzed product solution obtained. Thickening or evaporation to dryness is, however, also possible. Only in rare cases will it be necessary to prepare the hydrolyzed products in a pure form, ie. in the absence of accompanying salts, or to isolate them.

Such a separation of inorganic accompanying salts is possible, for example, by passing the neutralized hydrolyzed product solutions thrugh a series of acidic and basic ion exchangers and subsequent evaporation of the aqueous solution thus purified. In this purification by means of using several different ion exchangers, the pure hydrolyzed polymer is obtained in the free H-form. The evaporation residues were solid, crumbly, brownish products which redissolve in water to give clear solutions.

Such hydrolyzed products show, like the starting materials, a K value from 15 to 34 and, in the form of their sodium salts, have a content of the sodium salt of the acrylic acid units of 50 to 85% by weight, preferably 60 to 80% by weight, and a content of 100 to 500 milliequivalents of sulfonic acid groups per kg of hydrolyzed product, calculated as the Na form, corresponding to a sulfur content of about 0.3 to 1.5% and a residual nitrogen content of 0.2 to 5% by weight, and also contain strongly acidic groups, not derived from the sulfonic acid groups, of 300 to 1,500, preferably 500 to about 1,000, milliequivalents/kg of hydrolyzed product, calculated as the salt form.

The examples which follow serve to illustrate the invention further. Unless expressly indicated otherwise, the parts and percentages relate to units of weight. The following measurement and determination methods were used:

The K values of the above polymers were calculated, after determination of the $\eta_{rel}$ values on solutions of 0.5 g of polymer in 100 ml of dimenthylformamide at 20° C. with the aid of Ubbelohde viscometers with a suspended ball level, from the formulae of Fikentscher, Cellulosechemie 13, (1932), 58 et seq. The molecular weights $M_v$ were determined by the formulae of Marzolph and Scholtan in "Makrompolekulare Chemie 57, 52 et seq. (1962)". The intrinsic viscosity $[\eta]$ was likewise determined with the aid of Ubbelohde viscometers on solutions of varying concentration in dimethylformamide at 20° C.

The total amount of strongly acid groups (sulfonate and sulfate groups) was determined with the aid of various ion exchanger columns. For this, for example, 5 g of the polymer to be investigated are dissolved in 500 ml of dimethylformamide and the solution is passed over a first ion exchanger column with 100 ml of a strongly acid exchanger resin ($^{(R)}$ Levatit S 100 from Bayer AG). The resulting eluate is then passed over a second ion exchanger with 100 ml of a mixed bed resin of strongly acid and strongly basic ion exchanger resins (Levatit S 100/$^{(R)}$Duolite A 101D from Diamond Shamrock) and then again over 100 ml of a strongly acid ion exchanger. All the salts which are not bonded to the polymer are removed from the solution to be investigated by using the mixed bed exchanger.

The total content of strongly acid sulfonate and sulfate end groups is then obtained by potentiometric, non-aqueous titration of a given amount of eluate obtained after passage through the third ion exchanger column. Parallel to this, a dry content determination is carried out on about 20 g of eluate, for which the corresponding sample is dried in a vacuum drying cabinet at temperatures between 100° and 120° C.

To determine the sulfonate groups bonded directly to the polymer, the polymer to be investigated is first subjected to acid aqueous hydrolysis. For this, for example, 100 ml of a 0.2% strength aqueous oxalic acid solution are added to 15 g of the polymer powder and the mixture is boiled under reflux for 4 hours. The reaction solution is then filtered and the residue is washed carefully with hot distilled water until free from acid, after-treated with alcohol and dried at 60° C. An approximately 1% strength solution in dimethylformamide is prepared, as described above, from this hydrolyzed washed and dried sample, which now still contains only sulfonate groups, since the sulfonate ester groups have been split off, and the content is analyzed, after passage through the ion exchanger column system and subsequent potentiometric titration and separate dry value determination.

The content of sulfate groups is obtained from the difference between the total content of sulfonate and sulfate groups and the separately determined content of sulfonate groups. Distilled or completely demineralized water was always used in the polymerizations carried out.

The K values of the hydrolyzed products are determined analogously to the determination of the K values of the acrylonitrile polymers, but with the difference that the viscometric measurement was carried out on 1% solutions of hydrolyzed product in aqueous solutions of 1 mol of $NaNO_3$ in one liter of water at 25° C. In the determination of the K values, it is to be remembered that the hydrolyzed products must be neutralized before measurement (adjustment of the hydrolyzed prouducts to pH 7).

The determination of the total quantity of strongly acidic groups and the quantity of carboxylic acid groups of the acrylic acic units was carried out together by a cation exchanger passage of the hydrolyzed product solution over (R)Lewatit S 100 from Bayer AG and subsequent potentiometric titration of the resulting acids in the hydrolyzed product solution. At the first potential step in the strongly acidic region, the strongly acidic groups were determined, i.e. the sulfonic acid groups, the first stage of the sulfuric acid formed and the additional strongly acidic groups which presumably are N-acidic groups. The second potential step then corresponded to the quantity of carboxylic acid groups of the acrylic acid units.

The determination of the sulfonic acid groups was carried out on pure polymers free of accompanying salts and took place by potentiometric titration after a cation exchanger passage in 95% acetone solution. Under these conditions, only the stronger sulfonic acid is covered, but not the other, newly formed strongly acidic groups. The sulfur contents were likewise determined on the pure hydrolyzed products, since the sulfur in the molecule of the hydrolyzed product can then only originate from the sulfonic acid groups.

The determination of the additional strongly acidic groups can be carried out only indirectly, by comparing the analytical data of eluates after a cation exchanger passage once in aqueous solution and another time in 95% acetone as a solvent mixture with water. In hydrolyzed product samples which have not been purified, a determination of the additional strongly acidic groups is also possible since, in the presence of sulfuric acid, the additional strongly acidic groups are not covered in the titration due to the use of an acetone/water mixture.

The determination of $H_2SO_4$ after the cation exchanger passage or in the hydrolyzed product solution is carried out in the usual way by titration with 0.01 N barium perchlorate solution. The evaluation was carried out photometrically, using a Thorin solution.

EXAMPLE 1

2,622 ml of distilled water, 264 mg of $(NH_4)_2Fe(SO_4)_2.6\ H_2O$, 8.2 ml of 10% strength $H_2SO_4$, 12.2 g of $K_2S_2O_8$, dissolved in 600 ml of distilled $H_2O$, and 146.4 g of $Na_2S_2O_5$, dissolved in 970 ml of distilled $H_2O$, were introduced, after displacement of the air by $CO_2$, into a 5 liter four-necked glass flask provided with a double-blade stirrer and an outlet. The mixture was heated up to 55° C. and kept at this temperature with the aid of a thermostat. After the given temperature had been reached, continuous metering of the following four metering liquids was started. The following were metered per hour:

1. 611 ml of monomer mixture consisting of 585 ml of acrylonitrile and 26 ml of methyl acrylate
2. 1,166 ml of distilled $H_2O$ containing 93.4 mg of $(NH_4)_2Fe(SO_4)_2.6\ H_2O$ and 2.8 ml of 10% strength $H_2SO_4$,
3. 8.6 g of $K_2S_2O_8$, dissolved in 160 ml of distilled $H_2O$, and
4. 103.2 g of $Na_2S_2O_5$, dissolved in 160 ml of distilled $H_2O$.

2,100 ml of polymer suspension per hour were removed continuously from the reaction flask with the aid of a hosepump, the reaction volume and the average residence time of the reactants during the polymerization being kept constant.

The polymerization started after about 15 minutes, which was to be observed by clouding of the solution, and polymerization equilibrium was reached within 8 hours, after which the K value, the polymer yield, the particle shape and the polymer properties remained constant. The pH value of the reaction solution was measured as 2.87. The polymer suspension removed was neutralized in a second flask with the aid of 5% strength NaOH solution, and hence the polymerization was also stopped, and the polymer was isolated by filtration or centrifugation, washed with water and dried at 40° C. in a vacuum drying cabinet.

The K value of the resulting copolymer was 34 and the molecular weight $M_v$ was about 9,000. The polymer yield was 80% and the space/time yield was 95 g of polymer/liter.hour. The polymer contained 1.04% of sulfur and 260 mequiv/kg of strongly acid sulfonate and sulfate groups, of which 190 mequiv/kg were sulfonate groups.

It is of course also possible to stop the polymerization reaction by adding other known compounds, such as, for example, hydroquinone, especially if neutralization of the reaction solution is to be omitted.

EXAMPLE 2

The procedure followed was as under Example 1, but 292.8 g of $Na_2S_2O_5$, dissolved in 970 ml of distilled water, was used in the initial mixture. The other components remained unchanged. The amounts metered per hour were:
1. 611 ml of monomer mixture as in Example 1,
2. 1,006 ml of distilled $H_2O$, containing 93.4 mg of $(NH_4)_2Fe(SO_4)_2.6\ H_2O$ and 2.8 ml of 10% strength $H_2SO_4$
3. 8.6 g of $K_2S_2O_8$, dissolved in 160 ml of distilled $H_2O$
4. 206.4 g of $Na_2S_2O_5$, dissolved in 320 ml of distilled $H_2O$.

The pH value of the reaction mixture at equilibrium was 2.74.

A copolymer was obtained with a K value of 31 and a molecular weight $M_\nu$ of about 7,300 in a yield of 66% and a space/time yield of 78 g of polymer/liter.hour. The sulfur content was 1.42%, the content of sulfonate and sulfate end groups was 367 mequiv/kg and the content of sulfonate end groups alone was 265 mequiv/kg.

EXAMPLE 3

The procedure followed was as in Example 1, but with different initial amounts and metering liquids. The initial mixture consisted of 2,622 ml of distilled $H_2O$, 264 ml of $(NH_4)_2Fe(SO_4)_2.6\ H_2O$, 8.2 ml of 10% strength $H_2SO_4$, 15.2 g of $K_2S_2O_8$, dissolved in 600 ml of $H_2O$, and 364.8 g of $Na_2S_2O_5$, dissolved in 970 ml of $H_2O$. The following were metered per hour:
1. 611 ml of monomer mixture as in Example 1
2. 526 ml of $H_2O$ containing 93.4 mg of $(NH_4)_2Fe(SO_4)_2.6\ H_2O$ and 2.8 ml of 10% strength $H_2SO_4$
3. 10.8 g of $K_2S_2O_8$, dissolved in 320 ml of $H_2O$
4. 259.2 g of $Na_2S_2O_5$ dissolved in 640 ml of $H_2O$ In the stationary state, a pH value of the reaction solution of 2.73 was measured. The resulting copolymer had a K value of 28 and a molecular weight $M_\nu$ of about 6,300, the polymer yield was 54% and the space/time yield was 64 g of polymer/liter.hour. The polymer contained 1.64% of sulfur and had a total content of strongly acid groups of 424 mequiv/kg, of which 292 mequiv/kg were sulfonate groups.

EXAMPLE 4

Example 3 was repeated, but only acrylonitrile was used as the monomer. The initial mixture corresponded to that of Example 3, and the composition of the metering liquids and the amounts metered were changed only slightly:
1. 614.4 ml of acrylonitrile
2. 522.7 ml of $H_2O$ containing 93.2 mg of $(NH_4)_2Fe(SO_4)_2.H_2O$ and 2.9 ml of 10% strength $H_2SO_4$
3. 10.8 g of $K_2S_2O_8$, dissolved in 320 ml of water
4. 259.2 g of $Na_2S_2O_5$, dissolved in 640 ml of water.

In the stationary state, a pH value of 2.78 was measured in the reaction mixture. The resulting homopolymer had a K value of 23 and its molecular weight $M_\nu$ was about 5,000. A polymer yield of 58% and a space/time yield of 68 g/liter.hour were found. The sulfur content in the polyacrylonitrile was 2.19% and the total content of sulfonate and sulfate groups was 563 mequiv/kg, of which 451 mequiv/kg were sulfonate groups.

EXAMPLE 5

The initial mixture used was as described under Example 3, and the following amounts of liquid were metered:
1. 520.8 ml of acrylonitrile
2. 619.2 ml of water containing 99.0 mg of $(NH_4)_2Fe(SO_4)_2.H_2O$ and 3.1 ml of 10% strength $H_2SO_4$
3. 10.8 g of $K_2S_2O_8$, dissolved in 320 ml of water
4. 259.2 g of $Na_2S_2O_5$, dissolved in 640 ml of water.

The pH value of the reaction solution in the stationary state was 2.75. A homopolymer was obtained with a K value of 19.5 and a molecular weight $M_\nu$ of about 4,000. The polymer yield was 50% and the space/time yield was 50 g of polymer/liter.hour. The sulfur content of the polymer was determined as 2.61%.

EXAMPLE 6

Example 5 was repeated with a reduced amount of monomer. The initial mixture remained unchanged, and the following were metered per hour:
1. 449.5 ml of acrylonitrile
2. 687.4 ml of water containing 103.5 mg of $(NH_4)_2Fe(SO_4)_2.6\ H_2O$ and 3.1 ml of 10% strength $H_2SO_4$
3. 10.8 g of $K_2S_2O_8$, dissolved in 320 ml of water
4. 259.2 g of $Na_2S_2O_5$, dissolved in 640 ml of water.

The pH value of the reaction mixture was 2.75 in the stationary state. The resulting homopolymer had a K value of 18 and a molecular weight $M_\nu$ of about 3,500. The polymer yield was about 56%, the space/time yield was 48 g/liter.hour and the sulfur content was 2.90%.

EXAMPLE 7

The initial mixture chosen corresponded to that of Example 3, and the following were metered:
1. 303.9 ml of acrylonitrile
2. 832.6 ml of water containing 112.6 mg of $(NH_4)_2Fe(SO_4)_2.6\ H_2O$ and 3.5 ml of 10% strength $H_2SO_4$
3. 10.8 g of $K_2S_2O_8$, dissolved in 320 ml of water
4. 259.2 g of $Na_2S_2O_5$, dissolved in 640 ml of water.

The pH value in the stationary state was 2.63. The resulting homopolymer had a K value of 15.5 and a molecular weight $M_\nu$ of about 2,700. The sulfur content was 4.56% and the total amount of strongly acid groups was 986 mequiv/kg, of which 871 mequiv/kg were sulfonate groups. The polymer yield was about 42% and the space/time yield was 24.5 g/liter.hour.

EXAMPLE 8

The procedure followed was as in the preceding examples, using th device according to Example 1. The initial mixture used was 2,022 ml of water containing 2,640 mg of $(NH_4)_2Fe(SO_4)_2.6\ H_2O$, 8.2 ml of 10% strength $H_2SO_4$, 18.3 g of $K_2S_2O_8$, dissolved in 600 ml of water, and 549.0 g of $Na_2S_2O_5$, dissolved in 1,570 ml of water. The following amounts were metered in per hour:
1. 303.9 ml of acrylonitrile
2. 672.6 ml of water containing 1,126 mg of $(NH_4)_2Fe(SO_4)_2.6\ H_2O$ and 3.5 ml of 10% strength $H_2SO_4$
3. 12.9 g of $K_2S_2O_8$, dissolved in 320 ml of water
4. 387.0 g of $Na_2S_2O_5$, dissolved in 800 ml of water.

The pH value of the reaction solution in the stationary state was 2.72 and the resulting homopolymer had a K value of 16, a molecular weight of about 3,000 and a sulfur content of 5.8%.

EXAMPLE 9

The device according to Example 1 was again used. The initial mixture used was 2,022 ml of water containing 2,640 mg of $(NH_4)_2Fe(SO_4)_2.6\ H_2O$, 8.2 ml of 10% strength $H_2SO_4$, 45.8 g of $K_2S_2O_8$, dissolved in 1,200 ml of water, and 126 g of $Na_2S_2O_5$, dissolved in 970 ml of water. The following amounts were metered per hour:
1. 303.9 ml of acrylonitrile
2. 472.4 ml of distilled water containing 1,126 mg of $(NH_4)_2Fe(SO_4)_2.6\ H_2O$ and 3.5 ml of 10% strength $H_2SO_4$
3. 39.2 g of $K_2S_2O_8$, dissolved in 1,000 ml of water
4. 107.8 g of $Na_2S_2O_5$, dissolved in 320 ml of water.

The reaction mixture exhibited a pH value of 1.75 in the stationary state and the resulting polymer had a K value of 19, a molecular weight $M_v$ of about 3,700 and a sulfur content of 2.86%.

The following Examples 10 to 13 illustrate the influence of changes in the individual parameters.

EXAMPLE 10

Example 1 was repeatd, but only an amount of 34.4 g of $Na_2S_2O_5$ per hour was metered in. As a result of this change, the weight ratio of catalyst to activator was reduced from 1:12 to 1:4. In addition, only one third of the amount of $Na_2S_2O_5$ (48.7 g) was used in the initial mixture. Under these conditions, a stationary state was established at which the reaction mixture had a pH value of 2.53. However, the resulting polymer no longer had a K value of 34, but a K value of 44.

EXAMPLE 11

The batch of Example 3 was repeated, but the residence time of Example 3 of 2 hours was reduced in this Example 11 to 1 hour by doubling the amount of reaction mixture removed per hour from 2,100 ml to 4,200 ml and correspondingly increasing the amounts metered in by a factor of 2. In detail, the following amounts were metered per hour:
1. 1,222 ml of monomer mixture
2. 1,052 ml of water containing 186.8 mg of $(NH_4)_2Fe(SO_4)_2.\ 6\ H_2O$ and 5.6 ml of 10% strength $H_2SO_4$
3. 21.6 g of $K_2S_2O_8$, dissolved in 640 ml of water
4. 518.4 g of $Na_2S_2O_5$, dissolved in 1,280 ml of water.

In the stationary state, the reaction mixture exhibited a pH value of 2.75. Under these circumstances, a copolymer was produced which no longer had a K value of 28 but a K value of 31.

EXAMPLE 12

Example 11 was repeated, but the amount of Mohr's salt metered in was reduced from 186.8 mg to 18.7 mg per hour. The amount of this substance in the initial mixture was correspondingly reduced to 26.4 mg. Under these conditions, a copolymer was obtained which had a K value of 45, i.e. outside the range claimed.

EXAMPLE 13

Example 4 was repeated, but the amount of catalyst and activator was reduced, although the ratio of catalyst to activator remained unchanged at 1:24. In Example 13, only 8.6 g of $K_2S_2O_8$ and 206.4 g of $Na_2S_2O_5$ were added per hour. The content of catalyst and activator in the initial mixture was also correspondingly reduced to 12.2 g of $K_2S_2O_8$ and 292.3 g of $Na_2S_2O_5$. The pH value of the solution in the stationary state was measured as 2.86. However, the resulting polymer had a K value of 27, and no longer 23 as in Example 4.

EXAMPLE 14

192 g of NaOH lozenges were dissolved in 2,490 ml of water in a 4 liter three-necked flask with a stirrer and reflux condenser. The 7.16% strength sodium hydroxide solution was heated to the boiling point and three portions of in total 318 g of the copolymer of acrylonitrile and methyl acrylate with a K value of 34 which was obtained according to Example 1 were then added in the course of 15 minutes. At the start of the vigorous reaction, which proceeds with evolution of ammonia, the suspension becomes deep red-coloured. On further heating, a homogeneous yellow solution is then formed. The hydrolysis had ended after 6 hours. The hydrolysate solution had the following properties:
solids content: 19.2%
residual nitrogen: 0.9%
carboxyl groups which can be determined acidimetrically: 5.5% or 28.7% based on the solid content or 59.9% of sodium acrylate units based on the solids content.

The hydrolysis was repeated, except that the molar ratio of nitrile groups to NaOH was increased from 1:0.8 to 1:1.2. The higher content of alkali led to a more vigorous reaction. The resulting hydrolysis solution had the following values:
solids content: 22.9%
content of residual nitrogen: 0.5%
content of COOH groups: 6.9% or 30.1% calculated on the solid content or 62.9% of sodium acrylate units based on th solids content.

EXAMPLE 15

30.2 g of NaOH were dissolved in 392 ml of water in a 1 liter three-necked flask, the solution was heated to the boiling point and 157.6 g of a moist acrylonitrile homopolymer from Example 7 were added in portions. The moist polymer was obtained as a centrifuge residue with a solids content of 32% and had a K value of 15. The mixture was again hydrolyzed under reflux at the boil for 6 hours, and the nitrile group:NaOH molar ratio was 1:0.8.

EXAMPLE 16

20 g of polyacrylonitrile homopolymer in each case, having a K value of 23, were hydrolyzed for 6 hours under reflux with rising nitrile groups/NaOH molar ratio in a 500 ml three-necked flask provided with a stirrer and reflux condenser as in Example 14. Very pure, readily usable gaseous ammonia was evolved during the hydrolysis.

The starting polyacrylonitrile had the following characteristic data:
K value: 23.5
Sulfur content: 2.09%
Total content of sodium sulfonate and sodium sulfate ester groups: 427 millieqivalents/kg
Content of sulfonate groups: 300 milliequivalents/kg
Content of sodium sulfate ester groups: 127 milliequivalents/kg.

The hydrolysis conditions are given in Table 1 which follows, as are the solids content of the hydrolyzed product solution after completion of the hydrolysis carried out, likewise again in percent by weight, Since the hydrolyzed product solutions were evaporated to dryness without special precautions, the resulting solids contained, as a function of the nitrile groups/NaOH ratio, more or less free NaOH in addition to $Na_2CO_3$. The properties of the resulting solids of the hydrolyzed product solutions, which solids comprise the actual polymers and inorganic accompanying salts, are to be found in Table 2 which follows:

TABLE 1

| | Hydrolysis conditions | | |
|---|---|---|---|
| Example | Nitrile groups/NaOH molar ratio | % NaOH in the aqueous receiver | Solids content of the hydrolyzed product solution after completion in % |
| 16 a | 1:0.8 | 6.68 | 17.7 |
| 16 b | 1:1 | 7.57 | 17.9 |
| 16 c | 1:1.5 | 9.19 | 18.4 |
| 16 d | 1:2 | 10.29 | 18.9 |

TABLE 2

Properties of the solids (evaporated hydrolyzed product solutions)

| Example No. | % $Na_2CO_3$ | % $Na_2SO_4$ | % S | % NaOH | % Na acrylate units | Strongly acidic groups milli-equivalents/kg |
|---|---|---|---|---|---|---|
| 16 a | 3.25 | 1.29 | 1.22 | <0.1 | 71.9 | 1061 |
| 16 b | 4.39 | 1.18 | 1.16 | 1.13 | 78.4 | 1002 |
| 16 c | 8.69 | 1.15 | 0.91 | 8.00 | 65.6 | 847 |
| 16 d | 11.05 | 0.89 | 0.78 | 14.4 | 58.7 | 719 |

The sodium sulfate content was determined by sulfate titration, and $Na_2CO_3$ was determined by decomposition with sulfuric acid and absorption of the resulting $CO_2$ and subsequent titration. The content of sodium acrylate units and strongly acidic groups was determined after a cation exchanger passage.

The values in this Table 2 show that the saponification of the polyacrylonitriles is strongly dependent on the quantity of NaOH used. However, it must be pointed out here that, even if less than a stoichiometric amount is used (nitrile groups/NaOH molar ratio of only 1:08), unconsumed NaOH is still present after the actual hydrolysis, and this may then be partially converted into sodium carbonate on evaporation.

To obtain an analytical characterization of the hydrolysis products it was necessary to isolate them in a pure form. The accompanying substances were separated off by repeated use of ion exchangers. The hydrolysis solution was passed initially over a cation exchanger (R)Lewatit S 100 from Bayer AG and then over an anion exchanger (R)Duolite A 100D from Dow Chemical. By means of this combined use of cation and anion exchangers, it was possible to remove all interfering inorganic accompanying substances, and the pure hydrolyzed polymer in the H form remained in the eluate and could be isolated after evaporation as a solid, crumbly brownish mass. The hydrolyzed product can be dissolved in water to give a clear solution. The analytical results obtained for these pure products are summarized in Table 3 which follows.

TABLE 3

Properties of the hydrolyzed products, free of accompanying substances, in the H form

| Example | Nitrile groups/NaOH molar ratio | K value | Acrylic acid units % | Strongly acidic groups meq./kg | Sulfonic acid groups meq./kg | Additional strongly acidic groups meq./kg | % S | % N |
|---|---|---|---|---|---|---|---|---|
| 16 a | 1:0.8 | 23.4 | 53.4 | 853 | 250 | 603 | 0.87 | 4.32 |
| 16 b | 1:1 | 22.1 | 61.2 | 934 | 229 | 705 | 0.76 | 2.70 |
| 16 c | 1:1.5 | 22.9 | 70.5 | 954 | 198 | 756 | 0.72 | 2.30 |
| 16 d | 1:2 | 23.3 | 72.5 | 1037 | 158 | 879 | 0.70 | 1.31 |

In the results in Table 3, it is particularly remarkable that the K value of the hydrolyzed products is identical to the K value of the starting material and remains at 23, virtually independently of the applied nitrile groups/sodium hydroxide solution molar ratio. In contrast thereto, the contents of acrylic acid units and of strongly acidic groups rise with increasing use of NaOH, while the number of sulfonic acid groups decreases slightly.

The nitrogen content in the hydrolyzed product decreases clearly with rising nitrile groups/NaOH molar ratio. When 100% excess is used (molar ratio 1:2), unhydrolyzed nitrogen is still present.

EXAMPLE 17

8 g of polyacrylonitrile homopolymer having K values of 22, 27 and 29 were hydrolyed in each case with NaOH, as described under Example 14, in a 250 ml three-necked flask. The nitrole groups/NaOH molar ratio was 1:0.8 or 1:1. The other experimental conditions are to be found in Table 4 which follows, while the properties of the evaporated hydrolyzed product solutions are summarized in Table 5.

TABLE 4

| | | Hydrolysis conditions | | |
|---|---|---|---|---|
| Example No. | K value starting material | Nitrile groups/NaOH molar ratio | % NaOH in the receiver | Solids content in the hydrolyzed product |
| 17 a | 22 | 1:1 | 8.79 | 23.0 |
| 17 b | 27 | 1:0.8 | 7.16 | 19.5 |
| 17 c | 29 | 1:0.8 | 7.16 | 19.3 |
| 17 d | 29 | 1:1 | 8.79 | 25.1 |

TABLE 5

| | Analytical results | | | | | | | |
|---|---|---|---|---|---|---|---|---|
| Example No. | K value | % $Na_2SO_4$ | % S | % N | % Na acrylate units | Strongly acidic groups meq./kg | Sulfonate groups meq./kg | Additional strongly acidic groups meq./kg |
| 17 a | 22 | 1.01 | 1.08 | 1.84 | 68.4 | — | 267 | — |
| 17 b | 27 | 1.18 | 0.98 | 3.24 | 64.3 | 1392 | 223 | 993 |
| 17 c | 29 | 1.23 | 1.10 | 2.75 | 68.2 | 1489 | 257 | 1059 |
| 17 d | 29 | 1.21 | 0.82 | 1.17 | 61.0 | 1196 | 171 | 854 |

EXAMPLE 18

The saponification reactions so far described were generally carried out in batches such that the solids content in the hydrolyzed product was in most cases 16 to 18%. The series described below were intended to clarify the extent to which the batch concentration of polyacrylonitrile and sodium hydroxide can be raised while still obtaining complete hydrolysis. In these experiments, a molar ratio of nitrile groups:NaOH = 1:1 was always used. Some important results are summarized in Table 6 which follows.

TABLE 6

| Example | % NaOH in the receiver | % polymer added | % solids found in the hydrolyzed product | % N | Notes |
|---|---|---|---|---|---|
| 18 a | 8.79 | 10.4 | 23.0 | 1.84 | |
| 18 b | 12.61 | 14.4 | 26.2 | — | |
| 18 c | 16.13 | 17.7 | 35.9 | — | |
| 18 d | 19.46 | 20.5 | 41.6 | 0.68 | |
| 18 e | 22.46 | 23.0 | 50.3 | 0.66 | Solution cloudy |
| 18 f | 25.25 | 25.0 | 50.7 | — | Solution cloudy and highly viscous |

These experiments were carried out with acrylonitrile polymers having K values from 22 to 27. Under the chosen experimental conditions, it was found that very high polyacrylonitrile concentrations can be employed; the upper limit is at about 50% solids fraction after the hydrolysis, corresponding to a polyacrylonitrile fraction of about 25% in the hydrolysis batch.

EXAMPLE 19

The hydrolysis product according to Example 14 was tested for use as a scale inhibitor in accordance with the laboratory test method NACE standard TM/03/74. In the test, the amount of $CaSO_4$ or $CaCO_3$ present in the solution on addition of inhibitors is determined in comparison with a blank sample.

$CASO_4$ test: Two solutions are required: solution A) containing 7.5 g/liter of NaCl and 11.1 g/liter of $CaCl_2.2H_2O$, and a solution B) containing 7.5 g/liter of NaCl and 10.66 g/liter of $Na_2SO_4$. In each case, 50 ml of solution A) and B) are mixed in a bottle and, after addition of a given amount of hydrolysis product, the bottle is tightly closed, shaken thoroughly and heated at 71° C. for 72 hours. 1 ml of the clear, crystal-free solution above the $CaSO_4$ precipitate is then removed very carefully and diluted in a flask and the content of calcium ions present in the sample removed is determined complexometrically.

$CaCO_3$ test: In this case also, two solutions are required. Solution (A) contains 12.15 g/liter of $CaCl_2.2H_2O$, 3.68 g/liter of $MgCl_2.6 H_2O$ and 33 g/liter of NaCl, whilst solution (B) contains 7.36 g/liter of $NaHCO_3$, 0.0294 g/liter of $Na_2SO_4$ and 33 g/liter of NaCl. The two solutions are initially saturated with $CO_2$ and in each case 50 ml of the two solutions are then mixed with one another, measured amounts of hydrolysis product are added and the solutions are further treated as in the $CaSO_4$ test.

The results of the $CaSO_4$ test and of the $CaCO_3$ test on addition of hydrolysis solutions obtained according to Example 14, an even greater variation in the nitrile group/NaOH molar ratio having been made, are shown in Tables 7 and 8. The tables show, in addition to the given molar ratio, the content of calcium ions in mg/liter in th supernatant solution after addition of a corresponding amount of hydrolysate solution. The hydrolysate solutions can be regarded as being about 15% strength. The variations in the measurement values are in all probability to be attributed to extremely small crystals of calcium sulfate or calcium carbonate taken up with the sample.

The results show an astonishingly high effectiveness in the $CaSO_4$ test: about 93% of the $Ca^{2+}$ remains in the solution, down to a quantity of 0.5 ppm of the 15% solution employed. In the $CaCO_3$ test, the effectiveness is naturally lower: a maximum of about 60% of the $Ca^{2+}$ ions remain in solution. This effect is achieved even with only about 5 ppm of 15% solution.

EXAMPLE 20

Example 19 was repeated, but in this case with addition of a hydrolysis solution according to Example 15. In this case also, various runs which were obtained for different molar ratios of nitrile groups to NaOH during hydrolysis were investigated. The results have been recorded in Tables 3 and 4. As in the preceding example, an effectiveness in the $CaSO_4$ test to below 0.5 ppm of an approximately 15% strength hydrolysate solution was again found.

In the $CaCO_3$ test, results as in Example No. 19 were found.

The influence of the nitrile groups/NaOH molar ratio in the saponification is not very noticeable in the $CaSO_4$ test, and the effect increases slightly with a rising quantity of NaOH. In contrast thereto, it can be seen from Table 10 that a larger quantity of alkali in the $CaCO_3$ test leads to a more effective product. The optimum of effectiveness was at a molar ratio of 1:1.5. When larger quantities of NaOH are used, the effect is not markedly increased.

In Table 11 which follows, the best results on the effectivness of the hydrolyzed products as scale inhibitors are summarized, and in particular at the optimum nitrile groups/NaOH molar ratio of 1:1.5 before the hydrolysis. This shows that, in the $CaSO_4$ test, the effect increases with falling K value. In the $CaCO_3$ test, the influence of the K value is less relevant. For an almost 100% prevention of $CaSO_4$ precipitation, even such minute quantities as 0.015 ppm of the hydrolyzed product from the acrylonitrile polymer with a K value of 15 were accordingly sufficient. A 60% prevention of $CaCO_3$ precipitation is obtained even with only 0.45 ppm of hydrolyzed product.

TABLE 7

| | | $CaSO_4$ test: Content of $Ca^{++}$ ions in mg/l after addition of an approximately 15% strength hydrolysate solution in ppm | | | | | | | |
|---|---|---|---|---|---|---|---|---|---|
| Run | Molar ratio of nitrile groups/NaOH | 0 (blank sample) | 20 | 10 | 5 | 3 | 1 | 0.5 | 0.1 |
| a | 1:0.8 | 3620 | 5400 | 5090 | 5360 | 5260 | 5770 | 5200 | 3590 |
| b | 1:1 | 3600 | 4980 | 5140 | 5390 | 5170 | 5270 | 5090 | 3940 |
| c | 1:1.2 | 3620 | 5100 | 5390 | 5280 | 5230 | 5200 | 4680 | 3540 |

TABLE 7-continued

CaSO₄ test:

| Run | Molar ratio of nitrile groups/NaOH | 0 (blank sample) | 20 | 10 | 5 | 3 | 1 | 0.5 | 0.1 |
|---|---|---|---|---|---|---|---|---|---|
| d | 1:1.5 | 3670 | 5100 | 5170 | 5050 | 5180 | 5250 | 5220 | 3580 |

The maximum possible content was 5,535 mg of $Ca^{++}$/l

TABLE 8

CaCO₃ test:

Content of $Ca^{++}$ ions in mg/l after addition of an approximately 15% strength hydrolysate solution in ppm

| Run | Molar ratio of nitrile groups/NaOH | 0 (blank sample) | 20 | 10 | 5 | 3 | 1 |
|---|---|---|---|---|---|---|---|
| a | 1:0.8 | 3100 | 3730 | 3740 | 3690 | 3640 | 3450 |
| b | 1:1 | 3160 | 3900 | 4040 | 4100 | 4070 | 3500 |
| c | 1:1.2 | 3200 | 4100 | 4190 | 4230 | 4190 | 3750 |
| d | 1:1.5 | 3160 | 4340 | 4120 | 4300 | 3940 | 3360 |

The maximum possible content was 5,000 mg of $Ca^{++}$/L

TABLE 9

CaSO₄ test:

Content of $Ca^{++}$ ions in mg/l after addition of an approximately 15% strength hydrolysate solution in ppm

| Run | Molar ratio of nitrile groups/NaOH | 0 (blank sample) | 20 | 10 | 5 | 3 | 1 | 0.5 | 0.1 |
|---|---|---|---|---|---|---|---|---|---|
| e | 1:0.8 | 3520 | 5100 | 5090 | 5100 | 5100 | 5030 | 5030 | 3630 |
| f | 1:1.5 | 3520 | 5170 | 5220 | 5360 | 5280 | 5150 | 5130 | 4980 |
| g | 1:2.0 | 3590 | 5100 | 4980 | 5250 | 5080 | 5110 | 5060 | 3760 |

The maximum possible content was 5,140 mg of $Ca^{++}$/l

TABLE 10

CaCO₃ test:

Content of $Ca^{++}$ ions in mg/l after addition of an approximately 15% strength hydrolysate solution in ppm

| Run | Molar ratio of nitrile groups/NaOH | 0 (blank sample) | 20 | 10 | 5 | 3 | 1 |
|---|---|---|---|---|---|---|---|
| e | 1:0.8 | 3080 | 3340 | 3560 | 3290 | 3320 | 3200 |
| f | 1:1.5 | 3080 | 3950 | 4230 | 4020 | 3640 | 3480 |
| g | 1:2.0 | 3200 | 4100 | 4230 | 3900 | 4040 | 3720 |

The maximum possible content was 5,000 mg of $Ca^{++}$/l

TABLE 11

Optimum conditions as a scale inhibitor

| | Hydrolyzed PAN product, K value = 34 added as 15% solution with use of (as 100% active compound) | Effect | Hydrolyzed PAN product, K value = 15 added as 15% solution with use of (as 100% active compound) | Effect |
|---|---|---|---|---|
| CaSO₄ test | 0.075 ppm | 93% | 0.015 ppm | 100% |
| CaCO₃ test | 0.45 ppm | 62% | 0.45 ppm | 58% |

EXAMPLE 21

Some of the products obtained according to the preceding examples were tested for potential use as detergent raw materials, by a method of Henkel KG a.A., Düsseldorf, Germany. The principle of this method is to determine that quantity of a substance which is necessary to dissolve freshly precipitated CaCO₃.

For carrying out the determination, 5.5 ml of an Na₂CO₃ solution (10 g/liter) were introduced into a 150 ml beaker, and 50 ml of a solution of 1.11 g of CaCl₂/liter were then added with stirring all at once as well as, likewise all at once, 44.5 ml of distilled water, calcium carbonate precipitating. The concentration of the calcium chloride solution corresponds to a water hardness of 56° German hardness.

Immediately after the flocculation of CaCO₃ (at the latest after 5 seconds), a solution of the test substance in a concentration of 10 g/liter and with an adjusted pH value of 10 is added, initially very rapidly, until the precipitated calcium carbonate redissolves or the solution remains only slight cloudy. The duration of the titration should not exceed 20 seconds if possible.

The effectiveness is described as the Lime-binding capacity and is expressed in mg of Ca/g of substance.

The following Lime-binding capacities were determined by this method.

TABLE 12

Lime-binding capacity in mg of Ca/g of hydrolyzed product

| Example No. | Nitrile group/NaOH molar ratio | Hydrolyzed product calculated as solid | |
|---|---|---|---|
| | | K value: 23 | K value: 29 |
| 21 a | 1:0.8 | 156 | 136 |
| 21 b | 1:1 | 145 | — |
| 21 c | 1:1.5 | 197 | 148 |
| 21 d | 1:2 | 137 | 121 |

The table shows that the best results—as in the scale inhibitor test—were again obtained with hydrolyzed products which had been prepared at a nitrile groups/NaOH molar ratio of 1:1.5. In the most favorable case, a lime- binding capacity of the evaporated hydrolyzed products of about 200 mg of Ca/g of solid was found. This value must be regarded as very good. For comparison: polyacrylic acid of various provenances usually has a lime- binding capacity of 225 up to a maximum of 250 mg of Ca/g of active compound. However, the hydrolyzed products tested here contained, in addition to the active compound, also Na₂SO₄ and Na₂SO₃ and sometimes even NaOH. The actual value of the lime-binding capacity, calculated for active compound, can here be estimated as about 240 mg of Ca/g of active compound.

We claim:

1. A hydrolyzed polyacrylonitrile made by hydrolysis, involving heating a homopolymer or copolymer of an acrylonitrile containing at least 60% by weight of acrylonitrile units and up to 40% by weight of units copolymerisable with acrylonitrile having a K-value according to Fikentscher of 34 to 15 and a content of 180 to 900 milliequivalents sulfonate end groups which do not originate from comonomers containing sulfonate groups, in an alkaline aqueous solution sufficient to form a hydrolysate of said polyacrylonitrile showing the following properties:

a K-value equal to said K-value according to Fikentscher in the range of 34 to 15, sulfonic acid groups in a content in the range of 100 to 500 milliequivalents/Kg of the hydrolysate (as the Na salt) corresponding to a sulfur content of 0.3 to 1.5% by weight/kg of hydrolysate (as the Na salt).

acrylic acid units in a content (calculated as Na acrylate in the hydrolyzed product in the Na salt form) of 50 to 85% by weight.

strongly acidic groups other than sulfonic acid groups in a content of 200 to 1,500 milliequivalents/kg of hydrolyzed product (as the Na salt) and said product having a residual nitrogen content of about 0.3 to 5% by weight, relative to the quantity of hydrolyzed product in the Na salt form.

2. The hydrolyzed product as claimed in claim 1, wherein the content of acrylic acid units (calculated as Na acrylate in the hydrolyzed product in the Na salt form) is 60 to 80% by weight and the content of strongly acidic groups other than sulfonic acid groups is 500 to 1,000 milliequivalents/kg of hydrolyzed product (as the Na salt).

* * * * *